United States Patent
Stevenson et al.

(10) Patent No.: US 10,533,748 B2
(45) Date of Patent: Jan. 14, 2020

(54) COMBUSTOR BURNER ARRANGEMENT

(71) Applicant: Siemens Aktiengesellschaft, Munich (DE)

(72) Inventors: Imogen Stevenson, Norwich (GB); Ronald Bickerton, Belper (GB); Timothy Dolmansley, Worksop (GB)

(73) Assignee: Siemens Aktiengesellschaft, Munich (DE)

( * ) Notice: Subject to any disclaimer, the term of this patent is extended or adjusted under 35 U.S.C. 154(b) by 315 days.

(21) Appl. No.: 15/305,450

(22) PCT Filed: Apr. 30, 2015

(86) PCT No.: PCT/EP2015/059444
§ 371 (c)(1),
(2) Date: Oct. 20, 2016

(87) PCT Pub. No.: WO2015/166017
PCT Pub. Date: Nov. 5, 2015

(65) Prior Publication Data
US 2017/0045231 A1 Feb. 16, 2017

(30) Foreign Application Priority Data

May 2, 2014 (EP) .................................... 14166841

(51) Int. Cl.
*F23R 3/14* (2006.01)
*F02C 7/264* (2006.01)
(Continued)

(52) U.S. Cl.
CPC ................ *F23R 3/14* (2013.01); *F02C 7/264* (2013.01); *F23R 3/12* (2013.01); *F23R 3/286* (2013.01);
(Continued)

(58) Field of Classification Search
CPC .... F23R 3/14; F23R 3/286; F23R 3/04; F23R 3/12; F23R 3/343; F23D 11/12;
(Continued)

(56) References Cited

U.S. PATENT DOCUMENTS 4,402,740 A * 9/1983 Arp ..................... C22B 15/0032
266/900
4,717,332 A * 1/1988 Edens ................... F23D 11/001
431/187

(Continued)

FOREIGN PATENT DOCUMENTS

CN 102230623 A 11/2011
EP 1402956 A2 3/2004
(Continued)

OTHER PUBLICATIONS

EP Search Report dated Dec. 1, 2014, for EP application No. 14166841.8.
(Continued)

*Primary Examiner* — Scott J Walthour
*Assistant Examiner* — Jacek Lisowski
(74) *Attorney, Agent, or Firm* — Beusse Wolter Sanks & Maire

(57) ABSTRACT

A fuel lance for a burner of a combustor has a fuel lance body defining a fuel flow passage and a liquid fuel tip attached thereto and in flow communication with fuel flow passage. The liquid fuel tip has a fuel outlet and an array of air passages having outlets which are arranged outside a blank sector of a circumference around the fuel outlet, the blank sector defined by an angle from 30° to 160°. A burner includes the fuel lance and the igniter and a main air flow passage to direct at least a part of a main air flow over the fuel lance and over the igniter, the blank sector has a centre-line angled between +120° and −120° from a radial line from the axis and passing through the fuel lance. A method includes rotating the fuel lance between a start-up condition and a second condition.

13 Claims, 7 Drawing Sheets

(51) Int. Cl.
*F23R 3/12* (2006.01)
*F23R 3/28* (2006.01)
*F23R 3/38* (2006.01)

(52) U.S. Cl.
CPC ............ *F23R 3/38* (2013.01); *F05D 2220/32* (2013.01); *F23R 2900/00004* (2013.01)

(58) Field of Classification Search
CPC ......... F23D 17/002; F23D 2900/14005; F23C 2900/07021; F23C 7/004; F23C 7/008
See application file for complete search history.

(56) References Cited

U.S. PATENT DOCUMENTS

| | | | | |
|---|---|---|---|---|
| 5,431,019 | A * | 7/1995 | Myers | F23C 7/002 |
| | | | | 239/404 |
| 5,603,211 | A * | 2/1997 | Graves | F23C 7/002 |
| | | | | 60/39.48 |
| 5,944,507 | A | 8/1999 | Feldermann | |
| 5,996,333 | A | 12/1999 | Forestier et al. | |
| 6,289,676 | B1 | 9/2001 | Prociw et al. | |
| 9,581,334 | B2 * | 2/2017 | Bourgois | F23R 3/16 |
| 2006/0183069 | A1 * | 8/2006 | Bernero | F23D 17/002 |
| | | | | 431/354 |
| 2010/0170253 | A1 * | 7/2010 | Berry | F23R 3/12 |
| | | | | 60/742 |
| 2012/0304651 | A1 * | 12/2012 | Patel | F02C 7/22 |
| | | | | 60/740 |
| 2013/0189632 | A1 * | 7/2013 | Menon | F23R 3/14 |
| | | | | 431/354 |
| 2015/0020501 | A1 | 1/2015 | Bourgois et al. | |
| 2015/0040569 | A1 | 2/2015 | Sandelis et al. | |

FOREIGN PATENT DOCUMENTS

| | | | |
|---|---|---|---|
| EP | 2003398 A2 * | 12/2008 | ............ F23D 11/108 |
| EP | 2489939 A1 | 8/2012 | |
| FR | 2980554 A1 | 3/2013 | |
| RU | 2212001 C2 | 9/2003 | |
| WO | 2013060974 A2 | 5/2013 | |

OTHER PUBLICATIONS

International Search Report dated Jul. 27, 2015, for PCT application No. PCT/EP2015/059444.
RU search report dated May 14, 2018, for RU patent application No. 2016142786/06.
CN search report dated May 29, 2018, for corresponding CN patent application No. 2015800217196.

* cited by examiner

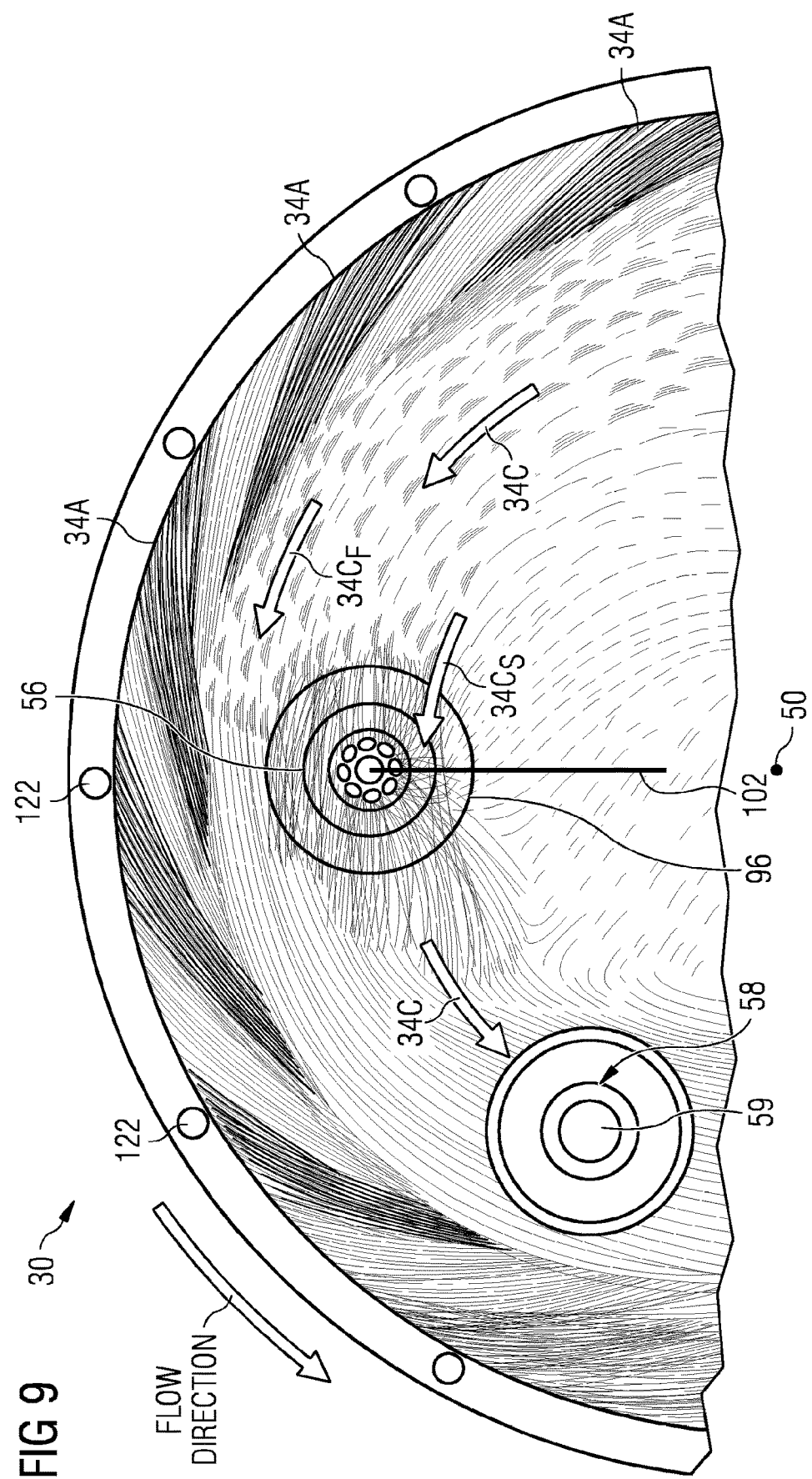

COMBUSTOR BURNER ARRANGEMENT

CROSS REFERENCE TO RELATED APPLICATIONS

This application is the US National Stage of International Application No. PCT/EP2015/059444 filed Apr. 30, 2015, and claims the benefit thereof. The International Application claims the benefit of European Application No. EP14166841 filed May 2, 2014. All of the applications are incorporated by reference herein in their entirety.

FIELD OF INVENTION

The present invention relates to combustion equipment of a gas turbine engine and in particular a liquid fuel lance for a burner arrangement of the combustion equipment, the burner arrangement and a method of operating the combustor equipment.

BACKGROUND OF INVENTION

Gas turbines including dry low emission combustor systems can have difficulty lighting and performing over a full load range when using liquid fuels. Often this can be because of fuel placement and subsequent atomization of the fuel in mixing air flows particularly at low loads. Ideally, the fuel droplets need to be very small and injected into an appropriate part of the airflow entering the combustor's pre-chamber in the vicinity of a burner arrangement to burn in the correct flame location. Also the fuel droplets should not contact any wall surface but at the same time the fuel droplets need to come close enough to the igniter so that the igniter can ignite the vaporised fuel on start up. If the fuel droplets contact a surface this can lead to carbon deposits building up or lacquers forming and which can alter airflow characteristics or even block air and/or fuel supply holes.

The liquid pilot injection lance can have additional air assistance to aid atomisation of the liquid fuel over a range of fuel flows. This air assistance can be a supplied via a number of air outlets completely surrounding a fuel orifice or filmer. This liquid pilot injection lance is in a region prone to liquid fuel contact and as a result tends to incur carbon deposits. These carbon deposits block the air assistance holes and subsequently prevent successful atomisation of the fuel. Poor atomisation of the pilot fuel also causes problems with ignition of the fuel at start-up. This is a common fault with gas turbine fuel injection systems and carbon build up is a common problem. Consequently, liquid pilot injection lances are regularly replaced and are considered a consumable part. This is undesirable because such replacement is expensive, causes the gas turbine to be off-line halting supply of electricity or power for example, and can be unscheduled.

SUMMARY OF INVENTION

One objective of the present invention is to prevent carbon deposits forming on components. Another objective is to prevent carbon deposits forming on a fuel lance of a combustor. Another object is to improve the reliability of igniting the fuel in a combustor. Another objective is to improve the entrainment of fuel droplets in an air flow. Another objective is to improve the atomisation of liquid fuel in a combustor. Another objective is to prevent liquid fuel contacting a surface within the combustor. Another objective is to reduce or prevent scheduled or unscheduled shut down of the engine for maintenance attributed to replacing or cleaning combustor components subject to carbon deposits and particularly the liquid fuel lance.

For these and other objectives and advantages there is provided a fuel lance for a burner of a combustor of a gas turbine combustor, the fuel lance has an axis and comprises a fuel lance body defining a fuel flow passage and a liquid fuel tip attached to the fuel lance body and in flow communication with the fuel flow passage, the liquid fuel tip comprises a fuel outlet and an array of air passages having outlets arranged about the fuel outlet, wherein the outlets are arranged outside a blank sector of a circumference around the fuel outlet, the blank sector is defined by an angle between and including 30° and 160° about the axis.

The outlets may be arranged outside the blank sector defined by an angle of between 120° and 160° about the axis.

The outlets may be arranged outside the blank sector defined by an angle of approximately 140° about the axis.

In one example, there are eight outlets equally spaced about the fuel outlet and between one and three circumferentially adjacent outlets are blocked off to create the blank sector.

In another aspect of the present invention there is provided a burner for a combustor of a gas turbine combustor, the burner comprises a burner body having a surface and an axis, a fuel lance, an igniter and a main air flow passage or passages, the fuel lance is at least partly housed within the burner body and comprises a liquid fuel tip having a fuel outlet and an array of air passages having outlets arranged about the fuel outlet, wherein the outlets are arranged outside a blank sector of a circumference around the fuel outlet, the blank sector is defined by an angle up to 160° about the axis, the outlets and the fuel outlet are located at or near to the surface, the igniter is at least partly housed within the burner body and has an end face, the end face is located at or near to the surface, the main air flow passage is arranged to direct at least a part of a main air flow over the fuel lance and then over the igniter, the blank sector has a centre-line and the centre-line is angled between +120° and −120° from a radial line from the axis and passing through the fuel lance.

The main air flow passage or passages may be tangentially angled relative to the burner axis to create a clockwise or anticlockwise swirl direction of the main air flow, the air passages may be tangentially angled relative to a fuel lance axis to create a clockwise or anticlockwise swirl direction of the pilot air flow.

The main air flow passage or passages and the air passages may be both tangentially angled in the same direction to create clockwise swirl direction of the main air flow and clockwise swirl direction of the pilot air flow or to create anticlockwise swirl direction of the main air flow and anticlockwise swirl direction of the pilot air flow, the centre-line of the blank sector is angled up to 60° from the radial line from the axis and passing through the fuel lance.

The centre-line of the blank sector may be angled up to 20° from the radial line from the axis and passing through the fuel lance.

The centre-line of the blank sector may be angled approximately 0° from the radial line from the axis and passing through the fuel lance. The term "approximately 0°" is intended to include 0° and relatively small non-zero angles which have the same or similar technical effect.

The main air flow passage or passages and the air passages may be oppositely tangentially angled to create oppositely swirling main air flow and pilot air flow, the centre-line of the blank sector may be angled between 0° and 120° from the radial line from the axis and passing through the fuel lance.

The igniter may be positioned downstream of the fuel lance with respect to the direction of the main air flow.

In another aspect of the present invention there is provided a method of operating a burner for a combustor of a gas turbine combustor, the burner comprises a burner body having a surface and an axis, a fuel lance, an igniter and a main air flow passage or passages, the fuel lance is at least partly housed within the burner body and comprises a liquid fuel tip having a fuel outlet and an array of air passages having outlets arranged about the fuel outlet, wherein the outlets are arranged outside a blank sector of a circumference around the fuel outlet, the blank sector is defined by an angle up to 160° about the axis, the outlets and the fuel outlet are located at or near to the surface, the igniter is at least partly housed within the burner body and has an end face, the end face is located at or near to the surface, the main air flow passage is arranged to direct at least a part of a main air flow over the fuel lance and then over the igniter the blank sector has a centre-line and the centre-line is angled relative to a radial line from the axis and passing through the fuel lance, the burner further comprises a rotation mechanism arranged to rotate the fuel lance about its axis, the method comprises the step of rotating the fuel lance between a start-up condition and a second condition.

At the start-up condition the blank sector may be angled between +120° and −120° from the radial line and at the second condition the blank sector may be angled between +240° and 0° from the radial line.

The second condition may be any one of the group comprising weak extinction, part-load or maximum load.

In one example, the fuel outlet is a fuel prefilmer and which may be divergent towards its end and can create a cone of fuel. In another example, the fuel outlet is an orifice and which can create a spray of fuel. In yet another example, the fuel outlet is a number of orifices and each orifice can create a spray of fuel.

BRIEF DESCRIPTION OF THE DRAWINGS

Further features, properties and advantages of the present invention will become clear from the following description of embodiments in conjunction with the accompanying drawings.

FIG. 9 is a view on the surface of the burner and along the burner's central axis and indicates the orientation of the liquid fuel lance relative to the main air flow from the main burner and relative to the burner's central axis and in accordance with the present invention.

DETAILED DESCRIPTION OF INVENTION

Figure 1:
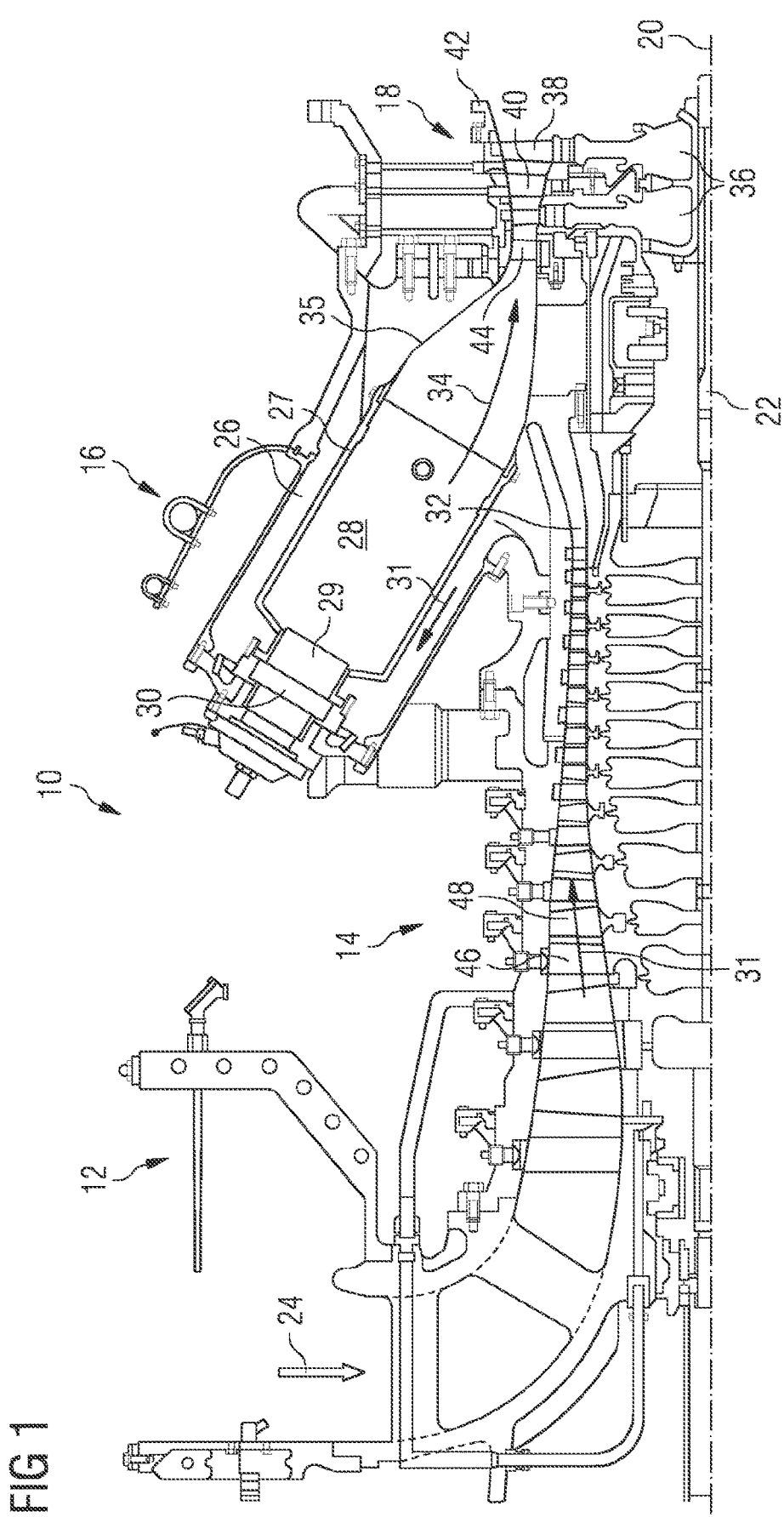
FIG. 1 shows part of a turbine engine in a sectional view in which the present invention is incorporated.

FIG. 1 shows an example of a gas turbine engine 10 in a sectional view and generally arranged about a longitudinal axis 20. The gas turbine engine 10 comprises, in flow series, an inlet 12, a compressor section 14, a combustor section 16 and a turbine section 18 which are generally arranged in flow series and generally in the direction of the longitudinal or rotational axis 20. The gas turbine engine 10 further comprises a shaft 22 which is rotatable about the rotational axis 20 and which extends longitudinally through the gas turbine engine 10. The shaft 22 drivingly connects the turbine section 18 to the compressor section 12. The combustor section 16 comprises an annular array of combustor units 16 only one of which is shown.

In operation of the gas turbine engine 10, air 24, which is taken in through the air inlet 12 is compressed by the compressor section 14 and delivered to the combustion section or unit 16. The combustor unit 16 comprises a burner plenum 26, a pre-chamber 29, a combustion chamber 28 defined by a double walled can 27 and at least one burner 30 fixed to each combustion chamber 28. The pre-chamber 29, the combustion chamber 28 and the burner 30 are located inside the burner plenum 26. The compressed air 31 passing through the compressor 12 enters a diffuser 32 and is discharged from the diffuser 32 into the burner plenum 26 from where a portion of the air enters the burner 30 and is mixed with a gaseous and/or liquid fuel. The air/fuel mixture is then burned and the resulting combustion gas 34 or working gas from the combustion chamber is channelled via a transition duct 35 to the turbine section 18.

The turbine section 18 comprises a number of blade carrying rotor discs 36 attached to the shaft 22. In the present example, two discs 36 each carry an annular array of turbine blades 38. However, the number of blade carrying rotor discs could be different, i.e. only one disc or more than two rotor discs. In addition, guiding vanes 40, which are fixed to a stator 42 of the gas turbine engine 10, are disposed between the turbine blades 38. Between the exit of the combustion chamber 28 and the leading turbine blades 38 inlet guiding vanes 44 are provided.

The combustion gas 34 from the combustion chamber 28 enters the turbine section 18 and drives the turbine blades 38 which in turn rotates the shaft 22 to drive the compressor section 12. The guiding vanes 40, 44 serve to optimise the angle of the combustion or working gas on to the turbine blades 38. The compressor section 12 comprises an axial series of guide vane stages 46 and rotor blade stages 48.

The terms upstream and downstream refer to the flow direction of the airflow and/or working gas flow through the engine unless otherwise stated. The terms forward and rearward refer to the general flow of gas through the engine. The terms axial, radial and circumferential are made with reference to the rotational axis 20 of the engine unless otherwise stated.

Figure 2:
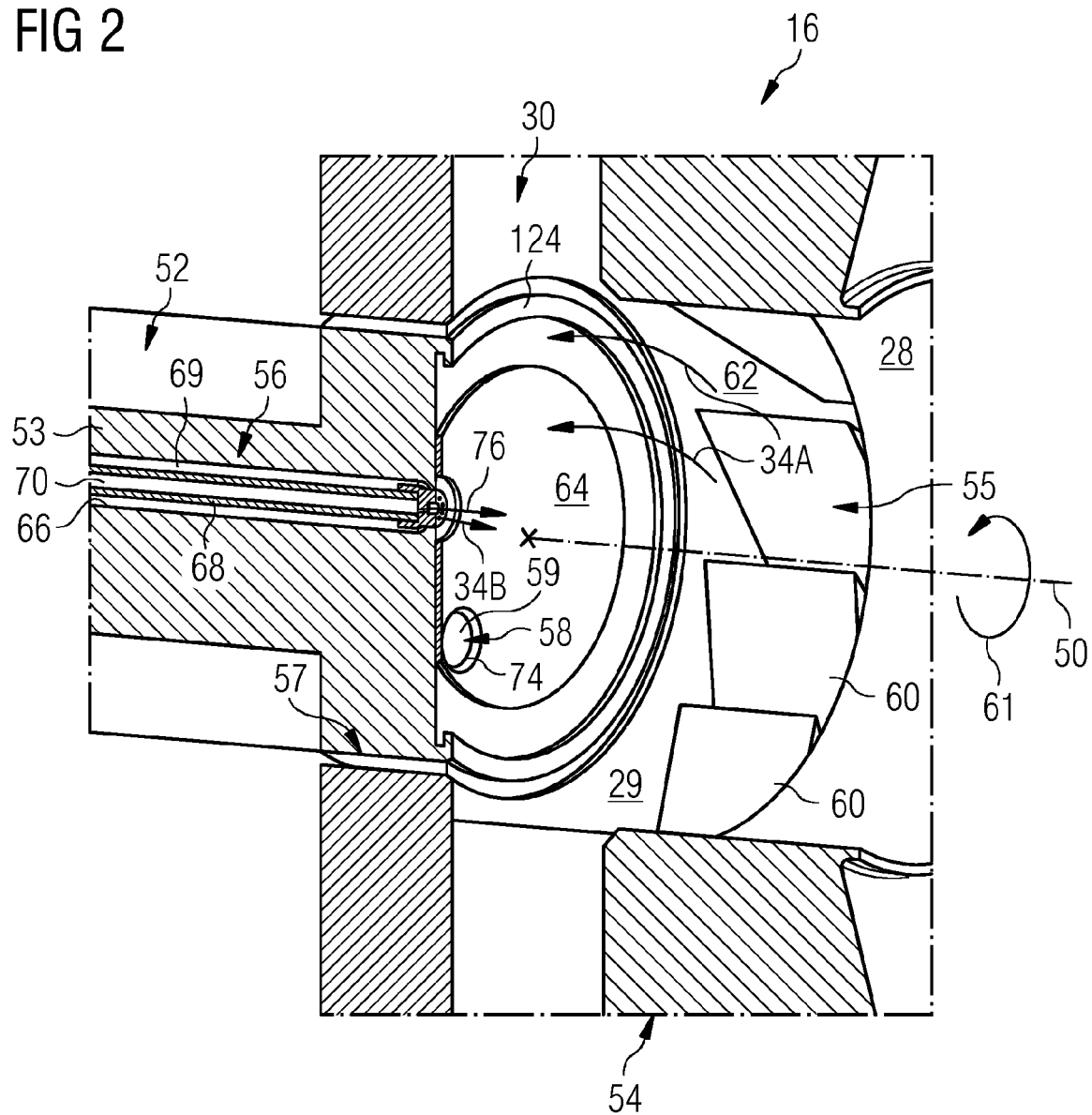
FIG. 2 shows a perspective schematic view of a section of a combustor unit of turbine engine and in detail a burner arrangement including a pilot burner surrounded by a main burner, the pilot burner having a liquid fuel lance and an igniter and is in accordance with present invention.

FIG. 2 is a perspective view of a part of the combustor 16 showing the burner 30, the pre-chamber 29 and part of the combustion chamber 28. The combustion chamber 28 is formed with a tubular-like shape by the double walled can 27 (shown in FIG. 1) having and extending along a combustor axis 50. The combustor 16 extends along the combustor axial 50 and comprises the pre-chamber 29 and the main combustion chamber 28, wherein the latter extends in a circumferential direction 61 around the combustor axis 50 and generally downstream, with respect to the gas flow direction, of the pre-chamber volume 29.

The burner 30 comprises a pilot burner 52 and a main burner 54. The pilot burner 52 comprises a burner body 53, a liquid fuel lance 56 and an igniter 58. The main burner 54 comprises a swirler arrangement 55 having an annular array of swirler vanes 60 defining passages 62 therebetween. The annular array of swirler vanes 60 are arranged generally about a burner axis 50, which in this example is coincident with the combustor axis 50, and in conventional manner. The swirler arrangement 55 includes main fuel injection ports which are not shown, but are well known in the art. The main burner 54 defines part of the pre-chamber 29. The pilot burner 52 is located in an aperture 57 and generally radially inwardly, with respect to the burner/combustor axis 50, of the main burner 54. The pilot burner 52 has a surface 64 that defines part of an end wall of the pre-chamber 29. The end wall is further defined by the main burner 54.

The liquid fuel lance 56 is at least partly housed in a first hole 66 defined in the burner body 53 of the pilot burner 52. A pilot air flow passage 69 is formed between the liquid fuel lance 56 and the walls of the first hole 66. The liquid fuel lance 56 comprises an elongate fuel lance body 86 and a liquid fuel tip 72. The elongate fuel lance body 86 is generally cylindrical and defines a fuel flow passage 70. The liquid fuel tip 72 is mounted at one end of the elongate fuel lance body 86 and is located near to or at the surface 64. The liquid fuel lance 56 will be described in more detail with reference to FIG. 3. The igniter 58 is housed in a second passage 74 defined in the burner body 53 of the pilot burner 52. The end of the igniter 58 is located near to or at the surface 64. The igniter 58 is a well known device in the art and that requires no further description. In other combustors 16 it is possible that more than one liquid fuel lance and/or more than one igniter may be provided.

During operation of the gas turbine engine and more particularly at engine start-up, a starter-motor cranks the engine such that the compressor 14 and turbine 18 are rotated along with the shaft 22. The compressor 14 produces a flow of compressed air 34 which is delivered to one or more of the combustor units 16. A first or major portion of the compressed air 34 is a main air flow 34A which is forced through the passages 62 of the swirler arrangement 55 where the swirler vanes 60 impart a swirl to the compressed air 31 as shown by the arrows. A second or minor portion of the compressed air 31 is a pilot air flow 34B which is forced through the pilot air flow passage 69. The pilot air flow 34B can also be referred to as an air assistance flow. Liquid fuel 76 is forced through the fuel flow passage 70 and is mixed with the pilot air flow 34B and the main air flow 34A in order to atomise the liquid fuel. Atomisation of the liquid fuel into very small droplets increases surface area to enhance subsequent vaporisation.

The main air flow 34A generally swirls around the combustor axis 50. The swirler vanes 60 impart a tangential direction component to the main air flow 34A to cause the bulk main air flow 34A to have a circumferential direction of flow. This circumferential flow aspect is in addition to the general direction of the air and fuel mixture along the combustor axis 50 from or near the surface 64 towards the transition duct 35 (see FIG. 1). The fuel and air mixture passes through the pre-chamber 29 and into the combustion chamber 28. The main air flow 34A forces the pilot air flow 34B and entrained fuel near to the igniter 58, which then ignites the fuel/air mixture.

To start the engine, a starter motor rotates the shaft 22, compressor 14 and turbine 18 to a predetermined speed when the pilot fuel is supplied and ignited. Once ignited the combustor internal geometry and the air flow patterns cause a pilot flame to exist. As the engine becomes self-powering the starter-motor can be switched off. As engine demand or load is increased from start-up, fuel is supplied to the main fuel injection ports and mixed with the main air flow 34A. A main flame is created in the combustion chamber 28 and which is radially outwardly located relative to the pilot flame.

Figure 3:
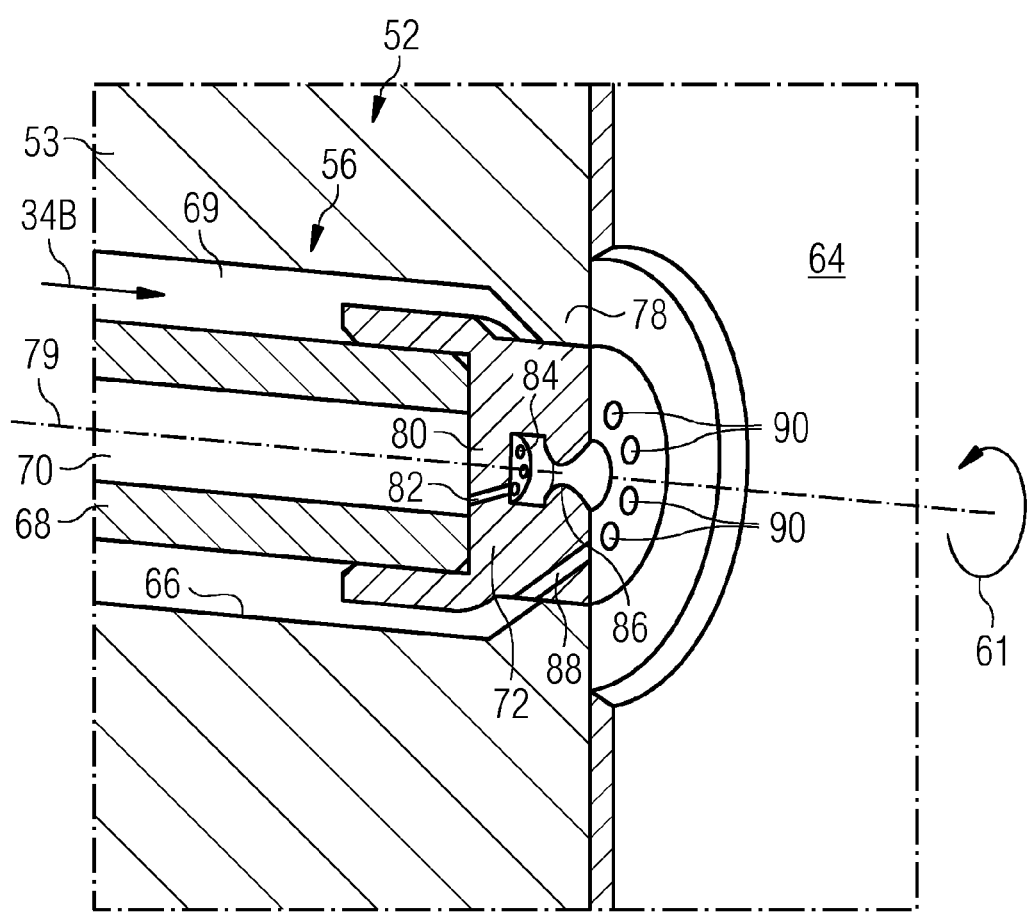
FIG. 3 shows a schematic perspective and cut-away view of part of the pilot burner and in detail the liquid fuel lance in accordance with present invention.

Reference is now made to FIG. 3, which shows a schematic perspective and cut-away view of part of the pilot burner 52 and in detail the liquid fuel lance 56. The liquid fuel lance 56 comprises the elongate fuel lance body 86 and the liquid fuel tip 72 which are elements that can be unitary or separate. The liquid fuel tip 72 is located and captured by a narrowing 78 at an end of the first hole 66 and forms a tight fit. At the end of the fuel flow passage 70, the liquid fuel tip 72 includes a swirl plate 80 which defines an array of fuel conduits 82 having inlets and outlets. The fuel conduits 82, only one of which is shown, are angled relative to a longitudinal or fuel lance axis 79 of the liquid fuel lance 56. Downstream of the swirl plate 80 is a fuel swirl chamber 84 and then a fuel outlet 86, which in this example is a fuel filmer. This fuel filmer 86 is divergent and produces a cone of liquid fuel. In other examples, the fuel outlet 86 can be an orifice that produces a spray of fuel or a number of orifices, each producing a spray of fuel.

The liquid fuel tip 72 forms an array of pilot air flow conduits 88 having inlets that communicate with the pilot air flow passage 69 and outlets 90 which surround the fuel filmer 86. In this exemplary embodiment, the pilot air flow conduits 88 are inclined or angled in both a circumferential sense and a radially inwardly relative to the longitudinal axis 79 of the liquid fuel lance 56. In other embodiments, the pilot air flow conduits 88 may be axially aligned, or angled in only one of the circumferential sense or radially inwardly relative to the longitudinal axis 79. In this exemplary embodiment there are 8 pilot air flow conduits 88; although in other embodiments there may be more or fewer conduits.

Pilot liquid fuel flowing in the fuel flow passage 70 enters the inlets of the fuel conduits 82 and exits the outlets imparting a swirl to the fuel in the fuel swirl chamber 84.

The swirling fuel forms a thin film over the fuel filmer 86, which sheds the fuel in a relatively thin cone. Pilot air flow 34B impinges the cone of fuel and breaks the fuel into small droplets. The swirling vortex of air from the outlets 90 atomises the fuel along with the main air flow 34A.

The pilot air flow 34B is particularly useful at engine start-up and low power demands when the main air flow 34A has a relatively low mass flow compared to higher power demands and because of the lower mass flow is less able to atomise the liquid fuel. Advantageously, the pilot air flow 34B provides cooling to the pilot fuel lance and helps prevent fuel coking and carbon build up on the pilot fuel lance.

Figure 4:
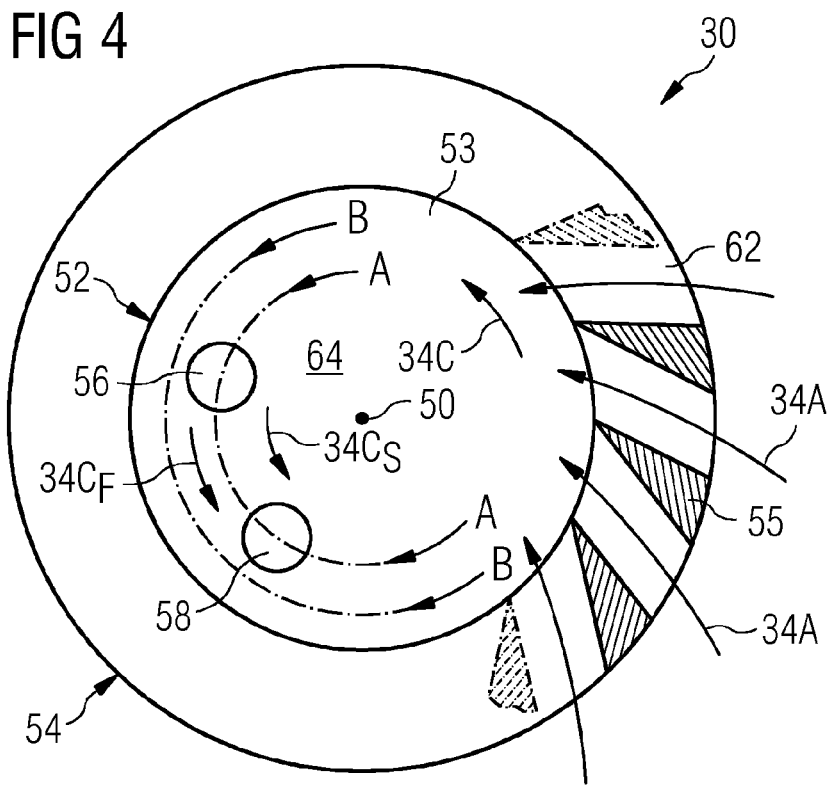
FIG. 4 is a view along a combustor axis and onto the surface of the burner where the pilot burner is generally surrounded by the main burner in accordance with present invention.

FIG. 4 is a view along the combustor axis 50 and on the surface 64 of the burner 30 where the pilot burner 52 is generally surrounded by the main burner 54. The liquid fuel lance 56 and the igniter 58 are shown mounted in the burner body 53 of the pilot burner 52. The swirler arrangement 55 of the main burner 54 surrounds the surface 64 and directs the main airflow 34B via the annular array of passages 62. The annular array of swirler vanes 60 and passages 62 are arranged to impart a tangential flow component to the main air flow 34A such that when the airflow portions from each passage 62 coalesce they form a vortex 34C generally about the burner axis 50. In this embodiment, the vortex 34C rotates generally anti-clockwise as seen in FIG. 4; this vortex 34C could also be said to be rotating in a clockwise direction as it travels in a direction from the surface 64 to the transition duct 35 through the pre-chamber 29 and then the combustor chamber 28.

In this exemplary embodiment, the vortex 34C is a single vortex, but in other examples the arrangements of pilot burner 52 and the main burner 54 can create a number of vortices rotating in either the same direction or different directions and at different rotational speeds.

The positions of the liquid fuel lance 56 and the igniter 58 are arranged so that the swirling or rotating main air flow 34A passes over or around the liquid fuel lance 56 and then on to the igniter 58. As the main airflow forms a vortex 34C about the axis 50, the liquid fuel lance 56 and the igniter 58 are positioned at approximately the same radial distance from the axis 50. Thus as the fuel lance 56 injects or sprays liquid fuel into the pre-chamber 29 the main airflow 34C entrains the fuel and transports it towards the igniter 58, where ignition can take place.

The vortex 34C has many different stream velocities within its mass flow. In this example, the portion of the vortex denoted by arrow 34Cs is travelling at a lower velocity than the portion of the vortex denoted by arrow 34Cf. Main air flow portion 34Cs is radially inwardly of main air flow portion 34Cf with respect to the axis 50. Main air flow portion 34Cs is at approximately the same radial position as the radially inner part of the pilot fuel lance 56 and the main air flow portion 34Cf is at approximately the same radial position as the radially outer part of the pilot fuel lance 56.

Figure 5:
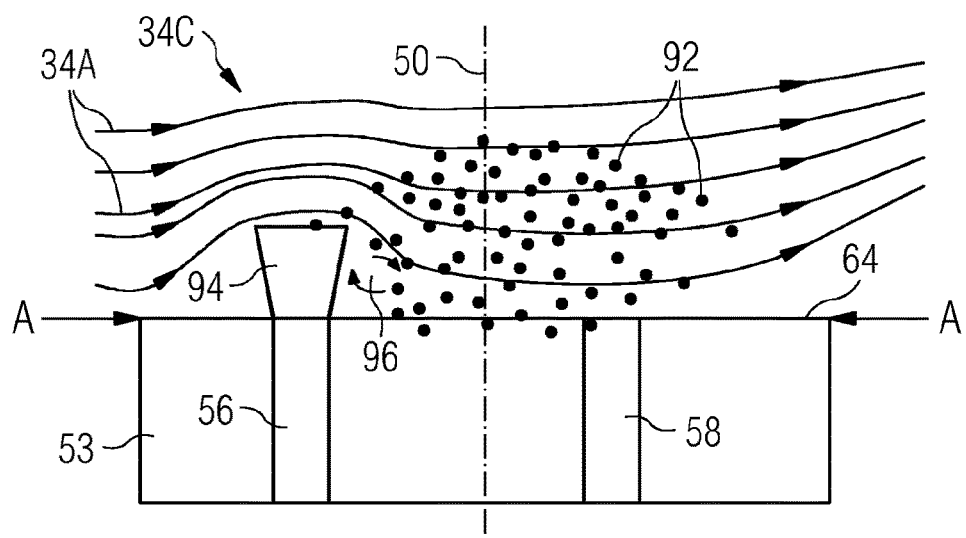
FIG. 5 and FIG. 6 show sectional views of the main air flow along paths A-A and B-B respectively as shown in FIG. 4 and illustrates respective distributions of fuel droplets issuing from the liquid fuel lance.
Figure 6:
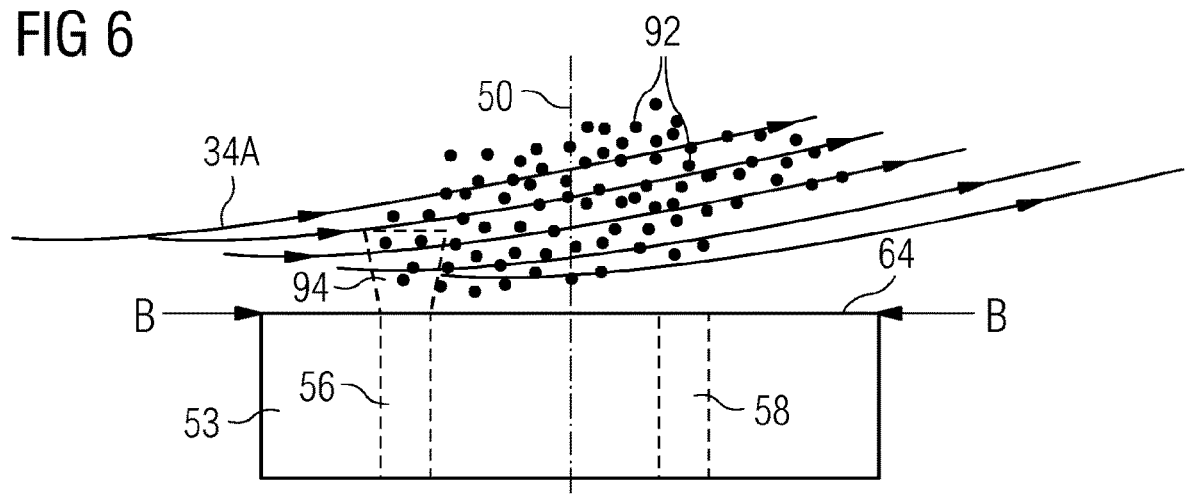

FIG. 5 and FIG. 6 show sectional views of the main air flow along paths A-A and B-B respectively as shown in FIG. 4 and the distribution of fuel droplets. In FIG. 4 the flow path B-B is radially outwardly of the fuel lance 56 and igniter 58 and the flow path A-A is approximately at the same radius as at least a part of the fuel lance 56 and igniter 58.

In FIG. 6 the fuel lance 56 and igniter 58 are shown in dashed lines for reference purposes. As shown, each portion of main air flow exiting each passage 62 flows for a short distance immediately across the surface 64, before leaving the surface 64 and travelling away from the surface 64 and along the axis 50 as another portion of the main air flow joins from a circumferentially adjacent passage 62. Thus as can be seen the any fuel droplets 92 entrained in this portion of the main air flow long flow path B-B are quickly lifted away from the surface 64 and therefore away from the igniter 58.

In FIG. 5 the main air flow 34A passes over the fuel lance 56 and on towards the igniter 58. The outlets 90, which surround the fuel filmer 86 of the fuel lance 56, direct the pilot air flow 34B to impinge on the cone of fuel exiting the fuel filmer 86 and break the fuel film into small droplets 92. The swirling vortex of pilot air, shown schematically as 94, from the outlets 90 atomises the fuel as it mixes with the main air flow 34A. The swirling vortex of pilot air 94 effectively forms a fluid buffer and causes to be formed on its leeward or downstream side a recirculation zone or a low-pressure zone 96. This recirculation zone or a low-pressure zone 96 draws the main air flow 34A towards the surface 64 between the fuel lance 56 and igniter 58. A portion of the fuel droplets 92 are also drawn towards the surface 64 and therefore close to the igniter 58 such that good ignition of the fuel/air mixture is possible.

Figure 7:
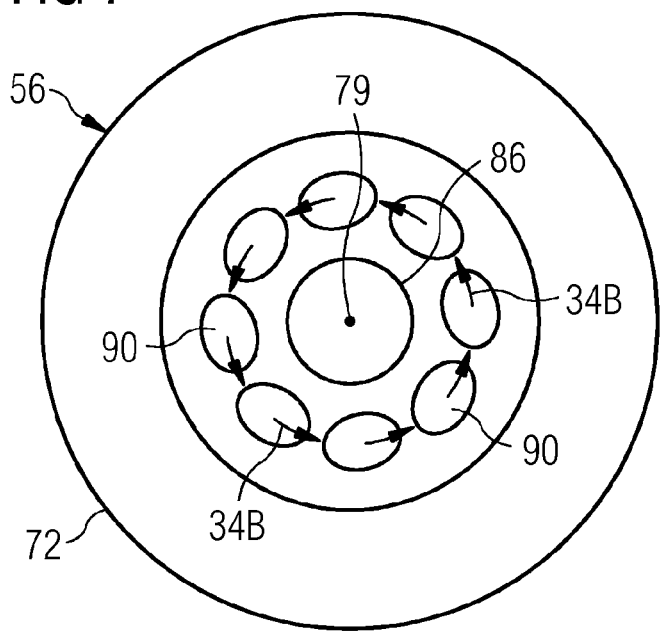
FIG. 7 is a view on a tip of a known liquid fuel lance and generally along its axis showing an array of outlets arranged symmetrically around a fuel outlet; the array of outlets directs a pilot air flow to impinge on, shearing and atomizing a liquid fuel film.

Referring now to FIG. 7, which is a view on the tip 72 of the fuel lance 56 and generally along its axis 79, the array of outlets 90 direct the pilot air flow 34B with a tangential component. When the portions of pilot air flow 34B from each outlet 90 merge they coalesce into the pilot vortex 94. The pilot vortex 94 rotates in a generally anti-clockwise direction as seen in FIG. 7; this vortex 94 could also be said to be rotating in a clockwise direction as it travels in a direction from the surface of the tip 72 towards the transition duct 35 through the pre-chamber 29 and then the combustor chamber 28. In one example, there are 8 outlets 90 arranged symmetrically about the axis 79 of the fuel lance and about the fuel filmer 86. This arrangement of outlets produces, at least initially, a symmetric pilot vortex 94.

However, in service it has been found that the outlets 90 become blocked by carbon deposits formed from liquid fuel landing on the surfaces of the fuel lance 56. This blocking reduces the amount of pilot air flow 34B which in turn this reduces the effectiveness of the pilot air flow 34B shearing and breaking up the fuel film. As a consequence ignition of the fuel/air mixture becomes more difficult and unpredictable. Thus it has been found that the symmetry of the pilot vortex 94 causes particular air flow characteristics that lead to liquid fuel contacting the surface of the fuel lance and which then forms carbon deposits that block the outlets 90.

Figure 8:
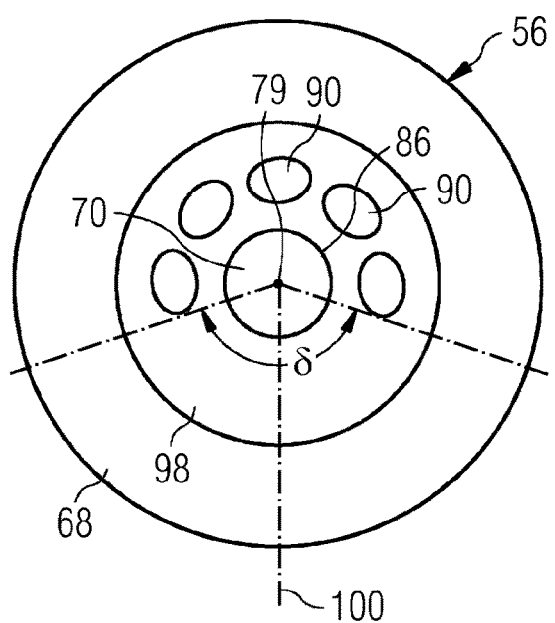
FIG. 8 is a view on a tip of the liquid fuel lance and generally along its axis showing an array of outlets arranged asymmetrically around a fuel outlet; a blank sector having no outlets can be seen, this asymmetric arrangement of outlets is in accordance with the present invention.

In FIG. 8 is a view on the tip 72 of the fuel lance 56 and generally along its axis 79, the array of outlets 90 direct the pilot air flow 34B with a tangential component. In this example, 3 of the outlets 90 have been fully blocked off in a blank sector 98. The blank sector 98 is defined by an angle $\vartheta$ about the fuel lance's axis 79. In this example the angle $\vartheta$ is approximately 140° and for other examples, the angle $\vartheta$ can be between and including 30° and 160°. Angles between 60° and 160° are more favourable and produce an asymmetric fuel/air vortex 94 which is readily broken up by the main air flow. Essentially these angles for the blank sector 98 relate to at least one and up to three outlets being blocked off. However, as should be appreciated any other design of fuel lance may incorporate more or less outlets 90 than the eight shown in this exemplary embodiment. The term 'blocked off' can mean that either the outlets 90 that exist are sealed, by welding or an insert for example, or by not forming some of the passages 88 and outlets 90 during manufacture of a new fuel lance. A centre-line 100 is shown in FIG. 8 and which is the centre-line or bisector of the blank sector 98 to define the orientation of the fuel lance 56 and blank sector 98 relative to the combustor chamber axis 50.

This arrangement creates an asymmetric pilot air flow 34B delivery and hence an asymmetric pilot vortex 94. This asymmetric pilot vortex 94 has the effect of keeping the fuel lance 56 free from liquid fuel landing on its surfaces and subsequent carbon deposits by creating an air flow regime around the pilot lance that shields the pilot lance 56 from droplets 92. This has the benefit that the pilot air flow outlets 90 do not block during use and therefore the quality of the fuel spray and atomization is maintained. Consequently, ignition at start-up is also improved. In addition, the pilot air flow or 'air assistance' being asymmetric increases the local turbulence and improves the shear on the droplets 92, aiding their atomization and pushing the droplets 92 away from the outlets 90, preventing any carbon build up due to the liquid fuel coming into contact with the injector surface.

The asymmetric pilot air flow 34B delivery and the asymmetric pilot vortex 94 remain strong enough to effectively form the fluid buffer 94 and cause to be formed on its leeward or downstream side, the recirculation zone 96 or low-pressure zone 96. Thus the recirculation zone 96 or low-pressure zone 96 still draws the main air flow 34A towards the surface 64 between the fuel lance 56 and igniter 58. A portion of the fuel droplets 92 are also drawn towards the surface 64 and therefore close to the igniter 58 such that good ignition of the fuel/air mixture remains equally possible.

It has been found that the asymmetric pilot vortex 94 is able to prevent or substantially prevent liquid droplets 92 contacting the surfaces of the fuel lance 56 whatever the orientation of the centre-line 100 of the blank sector 98. However, there is only a significant benefit to the delivery of fuel droplets 92 in the main flow to the igniter 58, as described above, if the orientation of the centre-line 100 is in a particular orientation compared to the vortex 34C or relative to the combustor chamber axis 50.

The air from the air passages 88 immediately impinges on the liquid fuel issuing from the fuel outlet 86, which is to say that there may be no other air passages or outlets between the fuel outlet 86 and the air passages 88. Thus the fuel/air vortex 94 may be created by only the fuel from the fuel outlet and the air from the air passages. Thus it is the combination of the fuel from the fuel outlet and the air from the air passages that creates the asymmetric pilot vortex 94.

Referring to FIG. 9 which is a view on the surface 64 of the burner 30 and along the axis 50 and from which a radial line 102 emanates and passes through the axis 78 of the fuel lance 56. The fuel lance 56 and igniter 58 are shown along with main airflow arrows 34A issuing from the main air flow passages 62. As described earlier, the portion of the vortex denoted by arrow 34Cf is travelling at a generally higher velocity than the portion of the vortex denoted by arrow 34Cs. The relatively slower flow is generally radially inward of the faster velocity air.

The fuel lance 56 as previously described is at least partly housed within the burner body 53 of the burner 30 and the outlets 90 and the fuel filmer 86 are located at or near to the surface 64. In this example, the outlets 90 and the fuel filmer 86 are located below the surface 64 in the burner body 53. The igniter 58 is also at least partly housed within the burner body 53 and has an end face 59, located just below the surface 64, but could be at or near to the surface 64.

The burner 30 further includes an array of gas injection ports 122 generally formed in a radially outward part of the burner 30 and under a circumferential lip 124 as shown in FIG. 2. These gas injection ports 122 can supply a pilot gas-fuel as is known in the art.

The terms clockwise and anticlockwise are with respect to the view on the surface 64 of the burner 30 as seen in FIG. 9.

In this exemplary embodiment, the centre-line 100 of the blank sector 98 and is angled at approximately 0° relative to the radial line 102 extending from the combustor chamber axis 50 to the fuel lance axis 78. Furthermore, the main air flow passages are tangentially angled relative to the burner axis 50 to create an anticlockwise swirl direction of the main air flow 34A and the air passages 88 are tangentially angled relative to the fuel lance axis 79 to create an anticlockwise swirl direction of the pilot air flow 34B. However, in this first embodiment the range of angles which provide at least some of the desired advantages of the present invention is between and including +60° and −60°. The most advantageous range of angles is between and including +20° and −20°.

In a second embodiment, the main air flow passages are tangentially angled relative to the burner axis 50 to create an anticlockwise swirl direction of the main air flow 34A and the air passages 88 are tangentially angled relative to the fuel lance axis 79 to create a clockwise swirl direction of the pilot air flow 34B. In this second embodiment the range of angles which provide at least some of the desired advantages of the present invention is between and including +120° and 0°.

In a third embodiment, the main air flow passages are tangentially angled relative to the burner axis 50 to create a clockwise swirl direction of the main air flow 34A and the air passages 88 are tangentially angled relative to the fuel lance axis 79 to create an anticlockwise swirl direction of the pilot air flow 34B. In this third embodiment the range of angles which provide at least some of the desired advantages of the present invention is between and including 0° and −120°.

Thus overall, the centre-line 100 of the blank sector 98 and can be angled between +120° and −120° from a radial line 102 from the axis 50 and passing through the fuel lance 56. In all embodiments, the igniter 58 is positioned downstream of the fuel lance 56 with respect to the clockwise or anticlockwise direction of the main air flow 34A.

The orientation of the fuel lance 56 as described above is advantageous in that the outlets 90 are kept free of carbon deposits and therefore good atomisation of the fuel film and good start-up ignition is maintained. During ignition it is important that fuel washes over the igniter 58 to ensure reliable ignition. However, during other engine conditions such as weak extinction, part-load or maximum load other orientations of the blank sector 98 are even more beneficial. During normal engine running, at engine speed or power above ignition or start up, it is desirable to avoid the fuel contacting or washing over the igniter 58 because it may form carbon deposits. Thus at ignition the condition described with reference to FIG. 5 is desirable where the fuel droplets wash over or very close to the injector; and during normal engine running it is desirable that the condition described with reference to FIG. 6 is desirable where the fuel droplets are generally carried away from the igniter.

Thus a method of operating the burner 30 in accordance with the present invention comprises the step of rotating the fuel lance between a start-up condition and a second condition. The second condition can be any one of the conditions such as weak extinction, part-load or maximum load. In particular, weak extinction is a condition where the flame can extinguish if there is further decrease in fuel supply and is related to flame stability. For the same fuel/air ratio with a lower weak extinction, the flame is less likely to extinguish.

Referring back to FIG. 8 and its description, the blank sector 98 has the centre-line 100 angled or orientated relative to the radial line 102; at engine start-up condition the blank sector 98 is angled between +120° and −120° from the radial line 102 and at the second condition the liquid fuel lance 56 is rotated about its own axis 79 such that the blank sector 98 is angled between +240° and −360° from the radial line 102. Thus in one example, at start-up the centre-line 102 is angled at approximately 0° from the radial line 102 and a high-power condition, the liquid fuel lance 56 is rotated by approximately −120° as viewed in FIG. 8.

In order to rotate the fuel lance 56 a rotation mechanism is provided and two examples are described with reference to FIG. 10 and FIG. 11.

Figure 10:
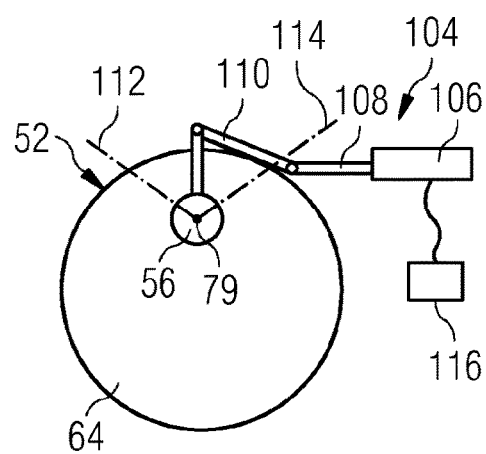
FIG. 10 is a schematic illustration on to the surface of the burner and including a first mechanism capable of rotating the liquid fuel lance about its own axis such that the blank sector can be orientated during different modes of operating the combustor and is in accordance with the present invention.

FIG. 10 is a schematic illustration on to the surface 64 of the burner 30 and includes a first mechanism 104 capable of rotating the liquid fuel lance 56 about its own axis 79 such that the blank sector 98 can be orientated to different positions during different modes of operating the combustor and/or engine. The first mechanism 104 comprises an actuator 106 having a drive rod 108 connected via a linkage 110 to the fuel lance 56. The fuel lance 56 may be mounted to the burner 30 via suitable bearings. The first mechanism 104 is capable or rotating the fuel lance between a first orientation 112 and a second orientation 114 shown schematically by the dashed lines. Each burner 30 is equipped with a first mechanism 104 and each first mechanism 104 is connected to an electronic controller 116. The electronic controller 116 sets the rotational position of the actuator 106 dependent on the engine or combustor condition. The electronic controller 116 may be a main engine controller or a stand-alone device. In this example, it is possible to independently orientate each liquid fuel lance 56 and depending on each combustor units' demanded output or condition.

Figure 11:
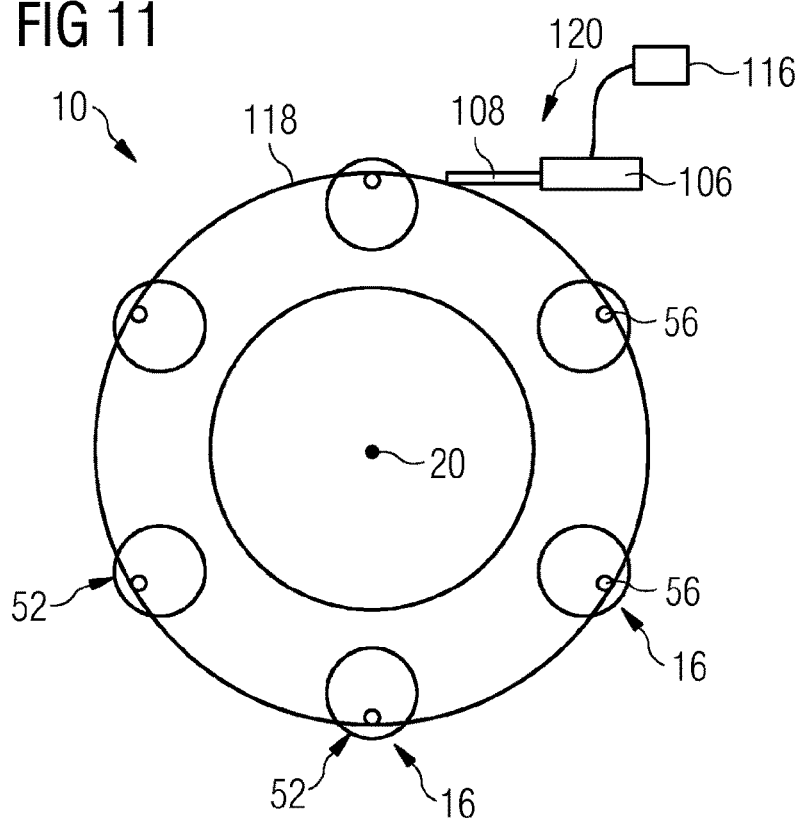
FIG. 11 is a schematic illustration of a section through a gas turbine engine showing the burners of the combustor units mounted around the engine and including a second mechanism capable of rotating the liquid fuel lances about their own axes such that the blank sector can be orientated during different modes of operating the combustor and is in accordance with the present invention.

FIG. 11 is a schematic illustration of a section through the gas turbine engine 10 showing the array of burners 30 of the combustor units 16 mounted around the engine and including a second mechanism 120 capable of rotating the liquid fuel lances 56 about their own axes such that the blank sector can be orientated to different positions during different modes of operating the combustor. In this example, like components have been give the same reference numerals and operate in a generally similar manner and will not be describe again. In this example, the second mechanism 120 includes an actuation ring 118 to which the actuator rod 108 is connected and to which each liquid fuel lance 56 is drivingly connected for rotation about its own axis. In this example, all of the liquid fuel lances 56 are rotated simultaneously and depending on the combustion systems' demanded output or condition.

It should be appreciated that the liquid fuel tip 72 is attached to the fuel lance body 68 in such a way that in service they are rigidly connected and cannot move relative to one another. However, the liquid fuel tip 72 may be removed from the fuel lance body 68 for servicing or replacement. Such a removable attachment may be achieved via cooperating screw threads or a bayonet fitting. Further, the liquid fuel tip 72 and fuel lance body 68 may be welded together or made integral, such as by casting.

What is claimed is:

1. A burner for a combustor of a gas turbine, the burner comprising:
    a burner longitudinal axis, a pilot burner, and a main burner;
    wherein the pilot burner comprises a body;
    wherein the body comprises a fuel lance, an igniter, and an end wall, the end wall comprising an end wall surface;
    wherein the fuel lance comprises a liquid fuel tip and a fuel lance body, the liquid fuel tip being attached to the fuel lance body, the fuel lance body defining a fuel flow passage and a lance axis, wherein the liquid fuel tip comprises a fuel outlet and an array of air passages comprising air passage outlets arranged about the fuel outlet, wherein liquid fuel flows through the fuel flow passage and the liquid fuel tip and issues from the fuel outlet, wherein the air passage outlets are arranged outside a blank sector of a circumference around the fuel outlet, wherein the blank sector is defined by an angle between and including 30° and 160° about the lance axis, and wherein air from the air passage outlets impinges on the liquid fuel issuing from the fuel outlet and creates an asymmetric pilot vortex of the liquid fuel and air,
    wherein the main burner comprises a swirler arrangement comprising an annular array of swirler vanes defining main air flow passages therebetween;
    wherein the annular array of swirler vanes are arranged about the burner longitudinal axis, and wherein each main air flow passage is configured to direct a respective portion of a main air flow radially inward toward the burner longitudinal axis on a downstream side of the air passage outlets to form the main air flow,
    wherein the air passage outlets and the fuel outlet are located in the end wall,
    wherein the igniter is at least partly housed within the end wall and comprises an end face, the end face is located at the end wall surface,
    wherein the main air flow passages are arranged to direct at least a part of the main air flow over the fuel lance and then over the igniter, and
    wherein the blank sector comprises a center-line and the center-line is angled between +120° and −120° from a radial line from the burner longitudinal axis and passing through the fuel lance.

2. The burner as claimed in claim 1,
    wherein the main air flow passages are tangentially angled relative to the burner longitudinal axis to create a clockwise swirl direction or an anticlockwise swirl direction of the main air flow, and
    wherein the array of air passages is tangentially angled relative to the lance axis to create the clockwise or the anticlockwise swirl direction of the asymmetric pilot vortex.

3. The burner as claimed in claim 2,
    wherein the main air flow passages and the array of air passages are both tangentially angled in the same direction to create the clockwise swirl direction of the main air flow and the clockwise swirl direction of the asymmetric pilot vortex or to create the anticlockwise swirl direction of the main air flow and the anticlockwise swirl direction of the asymmetric pilot vortex, and
    wherein the center-line of the blank sector is angled up to 60° from the radial line.

4. The burner as claimed in claim 3,
    wherein the center-line of the blank sector is angled up to 20° from the radial line.

5. The burner as claimed in claim 3,
    wherein the center-line of the blank sector is angled approximately 0° from the radial line.

6. The burner as claimed in claim 2,
wherein the main air flow passages and the array of air passages are oppositely tangentially angled so the main air flow and the asymmetric pilot vortex swirl opposite each other, and
wherein the center-line of the blank sector is angled between 0° and 120° from the radial line.

7. The burner as claimed in claim 2,
wherein the igniter is positioned downstream of the fuel lance with respect to a direction of the main air flow.

8. The burner as claimed in claim 1,
wherein the liquid fuel tip outlet comprises one of a fuel prefilmer, an orifice, or a number of orifices.

9. The burner as claimed in claim 1, further comprising:
a rotation mechanism arranged to rotate the fuel lance about the lance axis.

10. A method of operating a burner for a combustor of a gas turbine, the burner comprising a burner longitudinal axis, a pilot burner, and a main burner, the pilot burner comprising a body, the body comprising each of an end wall, a fuel lance, and an igniter, the end wall comprising an end wall surface, the fuel lance comprising a fuel lance body and a liquid fuel tip attached to the fuel lance body, the fuel lance body defining a fuel flow passage and a lance axis, the liquid fuel tip comprising a fuel outlet and an array of air passages, the array of air passages comprising air passage outlets arranged about the fuel outlet, wherein liquid fuel flows through the fuel flow passage and the liquid fuel tip and issues from the fuel outlet, the air passage outlets being arranged outside a blank sector of a circumference around the fuel outlet, wherein the blank sector is defined by an angle between and including 30° and 160° about the lance axis, and wherein air from the air passage outlets impinges on the liquid fuel issuing from the fuel outlet and creates an asymmetric pilot vortex of the liquid fuel and air, the burner further comprising a rotation mechanism arranged to rotate the fuel lance about the lance axis, the main burner further comprising a swirler arrangement comprising an annular array of swirler vanes defining main air flow passages therebetween, wherein the annular array of swirler vanes are arranged about the burner longitudinal axis, wherein each main air flow passage is configured to direct a respective portion of a main air flow radially inward toward the burner longitudinal axis on a downstream side of the air passage outlets to form the main air flow, wherein the air passage outlets and the fuel outlet are located in the end wall, wherein the igniter is at least partly housed within the end wall and comprises an end face, the end face is located at the end wall surface, wherein the main air flow passages are arranged to direct at least a part of the main air flow over the fuel lance and then over the igniter;
the method comprising rotating the fuel lance between a start-up condition and a second condition.

11. The method as claimed in claim 10,
wherein at the start-up condition the center-line is angled between +120° and −120° from a radial line from the burner longitudinal axis and passing through the fuel lance and
wherein at the second condition the center-line is angled between +240° and 0° from the radial line.

12. The method as claimed in claim 11,
wherein the second condition comprises one of weak extinction, part-load or maximum load.

13. The method as claimed in claim 10,
wherein the liquid fuel tip outlet comprises one of a fuel prefilmer, an orifice, or a number of orifices.

* * * * *